(12) United States Patent
Lee et al.

(10) Patent No.: US 10,758,860 B2
(45) Date of Patent: Sep. 1, 2020

(54) APPARATUS FOR TREATING MERCURY-CONTAINING WASTE AND METHOD FOR RECOVERING HIGH PURITY ELEMENTAL MERCURY USING SAME APPARATUS

(71) Applicant: INDUSTRY-ACADEMIC COOPERATION FOUNDATION YONSEI UNIVERSITY, Seoul (KR)

(72) Inventors: Tai Gyu Lee, Seoul (KR); Yu Jin Eom, Seoul (KR); Woo Rim Lee, Gwangju-si (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/773,213

(22) PCT Filed: Nov. 3, 2016

(86) PCT No.: PCT/KR2016/012551
§ 371 (c)(1),
(2) Date: Sep. 26, 2018

(87) PCT Pub. No.: WO2017/078415
PCT Pub. Date: May 11, 2017

(65) Prior Publication Data
US 2019/0015773 A1    Jan. 17, 2019

(30) Foreign Application Priority Data
Nov. 3, 2015 (KR) .................. 10-2015-0154125

(51) Int. Cl.
*B01D 53/00* (2006.01)
*B09C 1/06* (2006.01)
(Continued)

(52) U.S. Cl.
CPC .......... *B01D 53/005* (2013.01); *B01D 46/02* (2013.01); *B01D 53/002* (2013.01); *B09B 3/00* (2013.01);
(Continued)

(58) Field of Classification Search
CPC ....................................... B09C 1/005
See application file for complete search history.

(56) References Cited

FOREIGN PATENT DOCUMENTS

| KR | 1020030033525 A | 5/2003 |
|---|---|---|
| KR | 1020050004807 A | 1/2005 |

(Continued)

OTHER PUBLICATIONS

International Search Report of PCT/KR2016/012551, dated Jan. 13, 2017, English translation.

*Primary Examiner* — Melissa S Swain
(74) *Attorney, Agent, or Firm* — STIP Law Group, LLC

(57) ABSTRACT

The present invention relates to an apparatus for treating waste containing mercury and a method for recovering high purity elemental mercury using the apparatus. More specifically, the present invention may provide a method that can more economically and stably recover high purity elemental mercury from waste containing mercury using an apparatus for recovering mercury from waste containing mercury, the apparatus comprising: a thermal desorption unit; a dust control unit; and a condensation and recovery unit, which are connected in series. The present invention has an advantage in that, compared to a conventional simple heat treatment-condensation method, a high recovery rate of mercury is achieved and high purity mercury can be obtained.

4 Claims, 5 Drawing Sheets

(51) Int. Cl.
*B09B 3/00* (2006.01)
*B09B 5/00* (2006.01)
*B01D 46/02* (2006.01)
*B09C 1/00* (2006.01)

(52) U.S. Cl.
CPC .............. *B09B 3/0083* (2013.01); *B09B 5/00* (2013.01); *B09C 1/005* (2013.01); *B09C 1/06* (2013.01); *B01D 2257/602* (2013.01)

(56) References Cited

FOREIGN PATENT DOCUMENTS

| | | |
|---|---|---|
| KR | 100698764 B1 | 3/2007 |
| KR | 101299913 B1 | 8/2013 |
| KR | 1020140036276 A | 3/2014 |

[Figure 1]
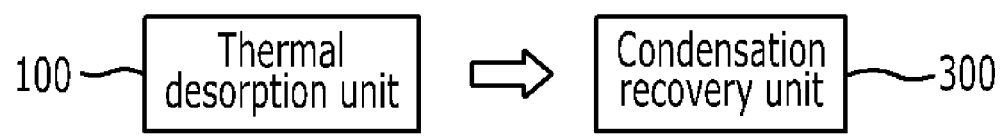
[Figure 2]

[Figure 3]
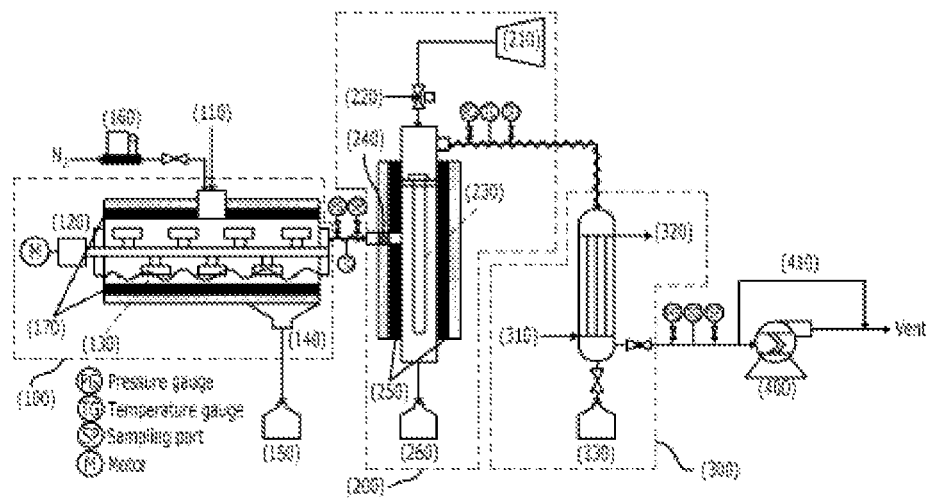
[Figure 4]
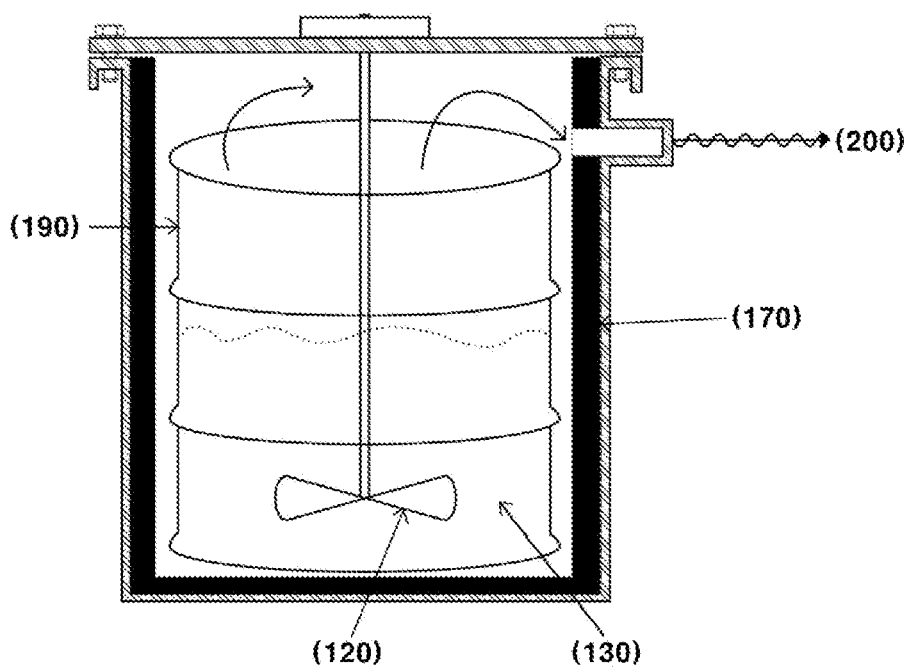

[Figure 5]
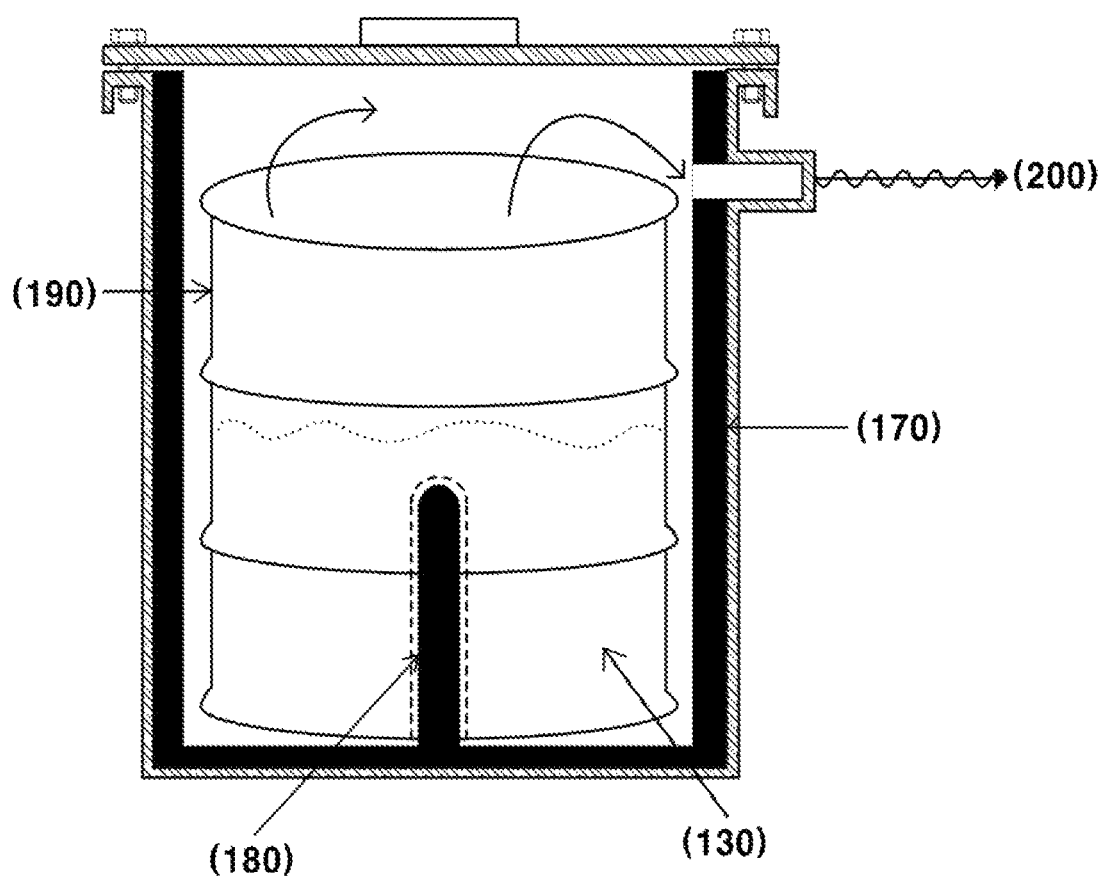

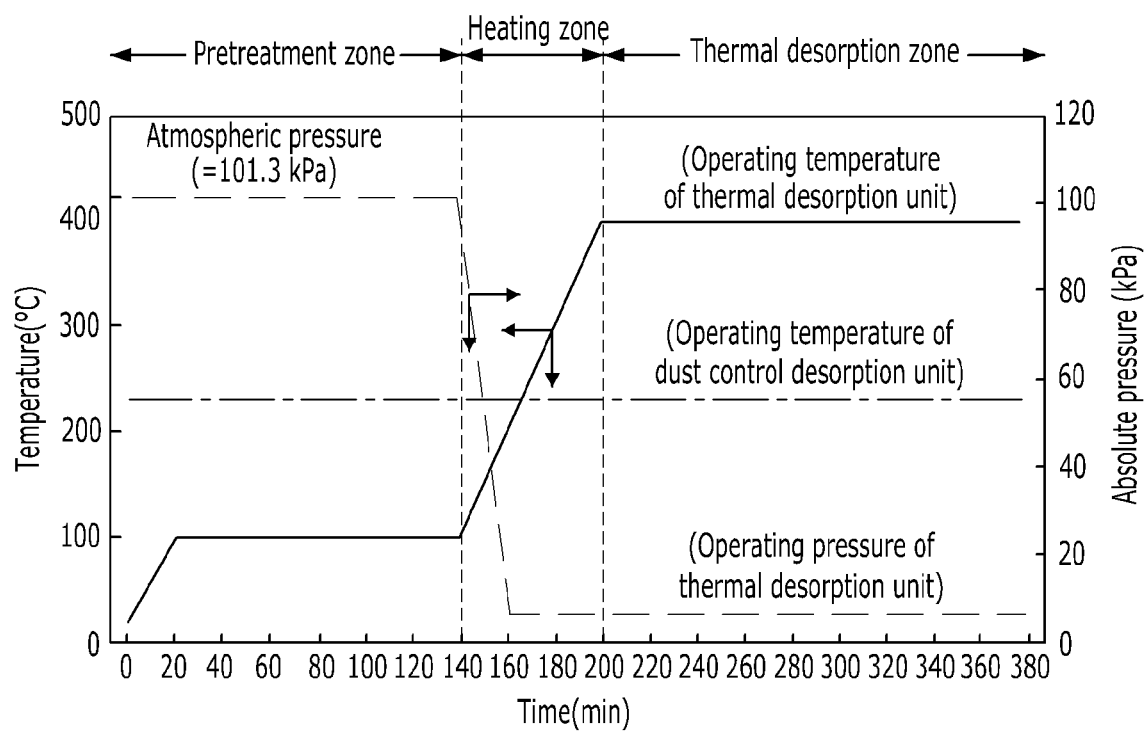
[Figure 6]

[Figure 7]
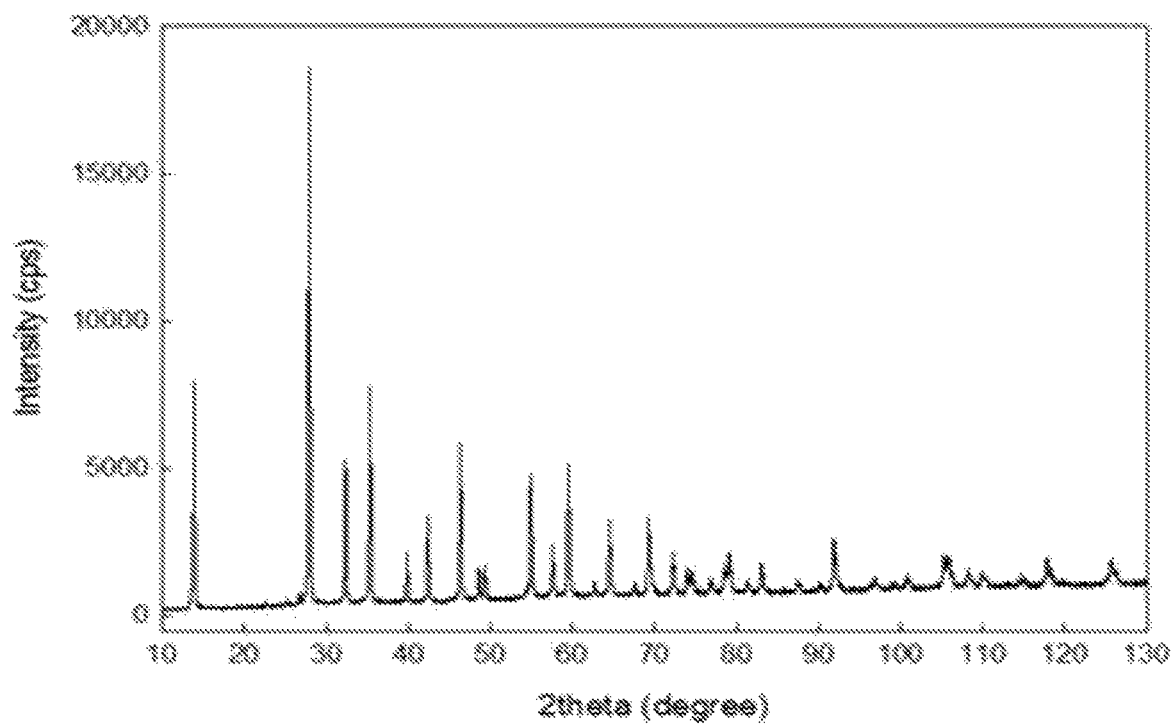

APPARATUS FOR TREATING MERCURY-CONTAINING WASTE AND METHOD FOR RECOVERING HIGH PURITY ELEMENTAL MERCURY USING SAME APPARATUS

CROSS-REFERENCE TO RELATED APPLICATIONS

This application is the U.S. National Phase under 35 U.S.C. § 371 of International Application No. PCT/KR2016/012551 filed on Nov. 3, 2016, which in turn claims the benefit of Korean Application No. 10-2015-0154125, filed on Nov. 3, 2015, the disclosures of which are incorporated by reference into the present application.

TECHNICAL FIELD

The present invention relates to an apparatus for treating mercury-containing waste and a method of recovering high-purity elemental mercury using the apparatus, and more particularly to a method capable of recovering high-purity elemental mercury from mercury-containing waste in a more cost-effective and secure manner by use of an apparatus for recovering mercury from mercury-containing waste, in which the apparatus includes a thermal desorption unit, a dust control unit and a condensation recovery unit, which are connected in series.

BACKGROUND ART

High-concentration mercury-containing wastes, including sludge, waste catalysts, waste fluorescent lamps, waste mercury lamps, waste amalgam and the like, which contain high concentrations of mercury, are discharged from various industrial facilities. When these mercury-containing wastes are merely classified and disposed of as toxic waste, not only can they be a major cause of soil contamination, but they can also enter groundwater via soil and threaten the aquatic ecosystem.

Since contamination of the ecosystem can lead directly to human mercury poisoning, thorough control of high-concentration mercury-containing waste is necessary. In addition, due to the Minamata International Mercury Convention (official name: Minamata Convention on Mercury), high-concentration mercury-containing waste will be controlled internationally.

In response to these international changes in the mercury control requirements, various companies and research institutes overseas have actively conducted research to develop processes and equipment for recovering mercury from high concentration mercury-containing waste and disposing of the waste as harmless waste. Also in Korea, governmental regulations on mercury-containing waste and disposal options for the waste have been actively reviewed.

Companies that manufacture systems capable of recovering mercury from mercury-containing waste include Mercury Recovery Services (MRS), Inc. (USA), Nomura Kohsan Co., Ltd. (Japan) and the like. MRS, Inc. has recovered mercury by the $MR^2$ (Mercury Removal/Recovery) process that includes thermal desorption, gas filtering and condensation. In this regard, the process is operated at a temperature of about 700° C. to 900° C. and is performed on various wastes, including soil, catalysts, by-products from metal smelting processes, sludge from wastewater treatment, and the like.

The mercury recovery technology of Nomura Kohsan Co., Ltd. (Japan) includes a thermal treatment process employing a rotary kiln, a wet cooling process, and a mercury purification process. The thermal treatment process is operated at a temperature of about 600 to 800° C. to treat mercury-containing wastes, including waste fluorescent lamps, batteries and the like, which are discharged from various industrial facilities.

This mercury desorption process that is performed using high-temperature thermal treatment has advantages in that it is conveniently operated and can certainly lower the mercury concentration of process by-products to a value lower than the limit value. However, the mercury desorption process has disadvantages in that energy efficiency can be relatively low due to the use of relatively high temperatures and in that the durability of the apparatus is easily reduced.

In addition, in conventional technologies for recovering mercury from fluorescent lamps, waste or the like have disadvantages, a separate unit capable of additionally separating mercury generated during thermal deposition and gaseous materials other than mercury is not present. Thus, there is a disadvantage in that various gaseous impurities separated together with mercury move to a condensation state together with mercury vapor, or the impurities may also be condensed together with mercury vapor in a connection tube without moving to the condensation stage, thereby reducing recovery of mercury. In addition, there is a disadvantage in that an additional separate process needs to be performed in order to high-purity mercury.

DISCLOSURE

Technical Problem

The present invention is directed to an apparatus for treating mercury-containing waste and a method of recovering high-purity elemental mercury using the apparatus, and more particularly to a method capable of recovering high-purity elemental mercury from mercury-containing waste in a more cost-effective and secure manner by use of an apparatus for recovering mercury from mercury-containing waste, in which the apparatus includes a thermal desorption unit, a dust control unit and a condensation recovery unit, which are connected in series.

The thermal desorption unit desorbs mercury by heat-treating mercury-containing waste at atmospheric pressure or heat-treating mercury-containing waste at a vacuum pressure of about 6.67 kPa by use of a vacuum pump. Although it is possible to desorb mercury even at atmospheric pressure and high temperatures, it is preferred that desorption of mercury be performed by thermal treatment under reduced pressure so that it can occur faster at a lower temperature compared to when it is performed by heating at atmospheric pressure. Thus, in this case, mercury may be effectively desorbed from waste even at a relatively low temperature of about 400° C.

Therefore, there is an advantage in that, because the process of treating mercury-containing waste or recovering mercury from the waste is performed at a relatively low temperature which is more efficient in terms of energy consumption and advantageous in terms of the durability of equipment, maintenance and repair are easy.

In addition, the apparatus of the present invention further includes a dust control unit between a thermal desorption unit configured to desorb mercury from waste and a condensation recovery unit configured to separate or recover mercury by condensation. Thus, it is possible to previously remove other gaseous impurities which are generated during the thermal desorption of mercury from waste and which may interfere with the condensation or recovery of high-purity mercury in a subsequent condensation recovery unit. This dust control unit includes an organic or inorganic porous filter which is not damaged or deformed even at a relatively high temperature of about 200 to 300° C., and it is operated at a temperature between the condensation points of mercury and other gaseous impurities, so that the impurities may be condensed on the (outer) surface of the porous filter and separated.

Thus, the dust control unit of the present invention may selectively condense and remove impurities desorbed from mercury-containing waste together with mercury vapor. Thus, it has the effects of increasing the recovery of elemental mercury in a subsequent condensation recovery unit and enabling high-purity elemental mercury to be effectively separated.

The mercury recovery apparatus of the present invention includes the thermal desorption unit, the dust control unit and the condensation recovery unit, which are connected in series, and it is more cost-effective and has higher energy efficiency than conventional known mercury recovery technologies. Furthermore, when international regulations on mercury-containing waste are enforced in the future, the apparatus of the present invention can efficiently and economically comply with the international regulations on mercury-containing waste when applied to facilities that discharge high-concentration mercury-containing waste. In addition, the apparatus of the present invention makes it possible to obtain an economic effect of creating new added value through the resale of recovered elemental mercury as a raw material.

Technical Solution

An apparatus for recovering mercury from mercury-containing waste according to one embodiment of the present invention includes: a thermal desorption unit configured to separate mercury from the mercury-containing waste; a dust control unit configured to remove impurities from the separated mercury; and a condensation recovery unit configured to condense and recover the mercury from which the impurities have been removed.

The thermal desorption unit may be an atmospheric pressure or vacuum thermal desorption unit, and the dust control unit is preferably operated at a temperature between the condensation temperature of the impurities and the condensation temperature of mercury.

Furthermore, the thermal desorption unit is preferably operated at a pressure and temperature at which mercury is vaporized from the mercury-containing waste, and the thermal desorption unit, the dust control unit and the condensation recovery unit are more preferably operated at the same pressure.

The dust control unit of the present invention preferably includes a porous filter, and is operated at a temperature lower than the operating temperature of the thermal desorption unit so that impurities generated together with mercury vapor will be condensed on the surface of the porous filter.

The thermal desorption unit is not limited to a particular shape or structure, and may have any shape or structure in which mercury-containing waste may be introduced and treated by heating or vacuum heating with appropriate stirring.

However, the thermal desorption unit may also be configured to directly receive a mercury waste drum. For example, the thermal desorption unit may be configured such that a drum containing mercury-containing waste may be introduced directly into the thermal desorption unit, and then heated or vacuum-heated while it is stirred by a separate stirrer, so that mercury may be desorbed from the waste. Alternatively, the thermal desorption unit may be configured such that a waste drum, which has formed in the central portion thereof a cylindrical structure into which a heating unit may be inserted, may be introduced directly into the thermal desorption unit and heated or vacuum-heated without additional stirring so that mercury may be desorbed from the waste.

Other embodiments of the present invention may include a method for recovering mercury from mercury-containing waste, the method including: a thermal desorption step of separating mercury by heating the mercury-containing waste; a dust control step of removing impurities from the mercury separated in the thermal desorption step; and a condensation recovery step of condensing and recovering the mercury from which the impurities have been removed.

The thermal desorption step may be performed at atmospheric pressure or a pressure lower than atmospheric pressure, and the dust control step is preferably performed at a temperature which is higher than the condensation temperature of mercury, but lower than the condensation temperature of impurities.

In addition, the thermal desorption step is performed at a pressure and temperature at which mercury is vaporized from the mercury-containing waste, and the thermal desorption step, the dust control step and the condensation recovery step are more preferably performed at the same pressure.

The dust control step may be performed using a porous filter, and may be operated at a temperature lower than the operating temperature of the thermal desorption step so that impurities present together with mercury may be condensed on the surface of the porous filter. The thermal desorption step is preferably performed by heating a waste collection drum itself without additional movement in a state in which the mercury-containing waste is contained in the waste collection drum.

Advantageous Effects

The mercury recovery apparatus and mercury recovery method of the present invention achieve higher mercury recovery than a conventional simple heat treatment-condensation method, and have the effect of enabling high-purity mercury to be obtained.

Furthermore, gaseous impurities other than mercury, which are generated from waste-containing waste in the thermal desorption process, may be separated in the dust control unit due to the difference in condensation point thereof from that of mercury. Specifically, when the dust control unit includes an organic or inorganic porous filter, which may be used at high temperatures, and is operated at a temperature between the condensation point of mercury and the condensation temperature of impurities, only impurities among mercury and gaseous impurities, which have been desorbed and moved from the thermal desorption unit, are condensed on the surface of the porous filter and removed. Accordingly, the gaseous material may be removed as dust, and gaseous mercury may be condensed in the condensation recovery unit, so that high-purity elemental mercury may be recovered.

The present invention has advantages in that it makes it possible to treat or recover mercury without being influenced by the shape and characteristics of waste, such as a solid state or a semi-solid state, and can perform mercury recovery under varying operating conditions depending on the waste introduced.

DESCRIPTION OF DRAWINGS

FIG. 1 is a flow diagram schematically showing processes which are performed using a conventional mercury recovery apparatus.

FIG. 2 is a flow diagram showing schematically showing processes which are performed using a mercury recovery apparatus of the present invention.

FIG. 3 more specifically shows an apparatus for recovering mercury from mercury-containing waste according to the present invention.

FIGS. 4 and 5 show modifications of a thermal desorption unit of the present invention.

FIG. 6 is a graph showing time-dependent changes in the operating temperatures and pressures of a thermal desorption unit and a dust control unit in a mercury recovery apparatus of the present invention.

FIG. 7 shows the results of XRD analysis of impurity dust obtained in a Comparative Example.

DESCRIPTION OF REFERENCE NUMERALS

100: thermal desorption unit;
200: dust control unit;
300: condensation recovery unit;
400: vacuum pump;
110: inlet;
120: stirrer;
130: sample;
140: outlet;
150: bottom ash collection tank;
160: MFC;
170: heating unit;
180: additional heating unit;
190: mercury-containing waste drum;
210: compressor;
220: pulse-jet valve;
230: porous filter;
240: dust filter;
250: heating unit;
260: dust collection tank;
310: cooling water inlet;
320: cooling water outlet;
330: collection tank;
410: by-pass line.

MODE FOR INVENTION

Hereinafter, an apparatus and a method for recovering mercury from mercury-containing waste according to the present invention will be described with reference to the accompanying drawings. The following description and the drawings attached to the specification illustrate preferred embodiments of the present invention, and the scope of the present invention should not be interpreted as being limited only to the contents shown in the drawings.

Throughout the specification, when any part is described as being "connected" to another part, it not only refers to a case where the parts are connected directly to each other, but also a case where the parts are connected to each other with other elements interposed therebetween. In addition, it should be understood that, throughout the specification, when any part is described as including any component, it does not exclude other components, but may further include other components, unless otherwise specified.

To fully understand the present invention, the operational advantages of the present invention, and objects achieved by the implementation of the present invention, reference should be made to the accompanying drawings which illustrate preferred embodiments of the present invention and to the contents shown in the accompanying drawings. However, in the following description, the description of already known functions or configurations will be omitted to clarify the subject matter of the present invention.

FIG. 1 is a flow diagram schematically showing processes which are performed using a conventional mercury separation or recovery apparatus described in the "Background Art" section above.

A conventional apparatus for removing, separating or recovering mercury from mercury-containing waste has a structure in which a desorption unit, configured to desorb mercury from waste, and a condensation unit configured to separate or recover desorbed mercury vapor by condensation, are connected to each other. However, the conventional mercury recovery apparatus composed of the desorption unit and the condensation unit has disadvantages in that the efficiency of recovery of mercury is low, the economic efficiency is low due to the high operating temperature of the desorption unit, and the purity of mercury recovered from the condensation unit is low.

FIG. 2 is a flow diagram schematically showing processes which are performed using a mercury recovery apparatus of the present invention. As shown therein, the apparatus includes a thermal desorption unit, a dust control unit and a condensation recovery unit, which are connected in series. Waste-containing waste is introduced through an inlet into a thermal desorption reactor in which it is heated while it is stirred by a stirrer. The heating in the thermal desorption unit may be performed at a temperature of about 400° C., and the pressure of the thermal desorption unit may, if necessary, be reduced to an absolute pressure of about 6.67 kPa.

When the thermal desorption unit is operated under this heating or vacuum heating condition, mercury is desorbed from the mercury-containing waste and transferred as mercury vapor to the dust control unit. At this time, the heating temperature, heating time, heating rate, pressure and the like of the thermal desorption unit may be freely set by a separate control box.

FIG. 3 is a schematic view more specifically showing this mercury recovery apparatus of the present invention. As can be seen in FIG. 3, mercury-containing waste is introduced through an inlet 110 into a thermal desorption unit 100 and is present as a sample 130 in the thermal desorption unit 100. A heating unit 170 present along the periphery of the thermal desorption unit heats the sample 130 in the thermal desorption unit. If necessary, a vacuum pump 400 may be operated so that the inside of the thermal desorption unit 100 may be maintained at vacuum pressure lower than atmospheric pressure. After the sample 130 is introduced into the thermal desorption unit 100 as described above, a stirrer 120 is driven by a motor and mechanically stirs the sample to help desorb mercury from the sample 130.

Mercury vapor desorbed from the sample 130 as described above is transferred to the dust control unit 200 by a carrier gas (e.g., inert nitrogen gas, etc.) which is supplied by a mass flow controller (MFC) 160.

On the outside of a connection tube between the thermal desorption unit 100 and the dust control unit 200, a heating coil may be present in order to maintain the temperature of the connection tube so that condensation in the connection tube between the units will not occur. If necessary, a pressure gauge (PG), a temperature gauge (TG), a sampling port (SP) and the like may also be disposed. To simplify the structure, the thermal desorption unit 100 may also be connected directly to the thermal desorption unit 200 without a separate connection tube.

When the sample is introduced into the thermal desorption unit 100, the mercury-containing waste is not independently introduced into the inlet 100. Namely, as shown in FIG. 4, the inlet may be designed larger than the size of a drum containing the mercury-containing waste so that the drum containing the mercury-containing waste may be introduced directly into the thermal desorption unit 100. In this case, the stirrer 120 may also be configured to extend into the drum.

Alternatively, mercury desorption may be effectively performed in the thermal desorption unit 100 without a stirrer. To this end, as shown in FIG. 5, a mercury waste drum which is to be introduced directly into the thermal desorption unit 100 may have in the central portion thereof a cylindrical portion into which a heating unit may be inserted. In this case, the waste drum may be introduced directly into the thermal desorption unit, and heated or vacuum-heated by a heating unit 180 extending to the central portion of the drum without additional stirring so that mercury may be desorbed from the waste.

Gases including mercury desorbed from the waste in the thermal desorption unit 100 as described above are transferred to the dust control unit 200 by an inert carrier gas which is supplied by the MFC 160. Alternatively, when a preheating step of previously removing moisture from the waste in the thermal desorption unit 100 is performed, the apparatus of the present invention may also include a by-pass line which is not connected to the subsequent dust control unit 200, but is connected to the condensation recovery unit 300.

In the present invention, the dust control unit 200 connected to the thermal desorption unit 100 separates gaseous materials from mercury vapor, generated from the mercury-containing waste during operation of the thermal desorption unit, by the difference in the condensation point of the materials from the condensation point of mercury.

The dust control unit 200 is operated at the same pressure as the operating pressure of the thermal desorption unit 100 and the subsequent condensation recovery unit 300 in which mercury is condensed and recovered. Specifically, it may be operated at the same atmospheric pressure or vacuum pressure. However, the dust control unit 200 is preferably operated at a temperature lower than the operating temperature of the thermal desorption unit. More preferably, it is operated at a temperature which is higher than the condensation temperature of mercury, but lower than the condensation temperature of gaseous impurities.

Desorbed mercury gas discharged from the thermal desorption unit 100 is first introduced into the dust control unit through a filter 240, and a heating unit 250 is disposed on the outside of the dust control unit 200. Thus, the inside of the dust control unit 200 is controlled so that it may be maintained at a temperature which is lower than the operating temperature of the thermal desorption unit 100, but higher than the condensation temperature of mercury.

In the dust control unit 200, a porous filter 230 which may be used at high temperatures is disposed so that gaseous impurities other than moved mercury desorbed from the waste in the thermal desorption unit 100 may be condensed on the surface of the porous filter 230. Namely, because the operating temperature of the dust control unit 200 is higher than the operating temperature of mercury, but lower than the condensation temperature of impurities, gaseous impurities are condensed on the surface of the porous filter 230 and removed as dust, and mercury gas passes through the porous filter 230 and moves to the subsequent condensation recovery unit 300.

In addition, the dust control unit 200 includes an air compressor 210 so that dust formed by condensation of impurities on the outside of the porous filter 230 may be removed by an air pulse introduced through a pulse-jet valve 220 and collected in a dust tank 260 at the bottom.

The porous filter 230 that is used in the present invention is a porous filter having pores permeable to mercury gas. As the porous filter, any porous filter made of organic or inorganic material may be used without particular limitation as long as it does not undergo thermal deformation or material changes even at a temperature higher than the condensation temperature of mercury. Specifically, it is preferable to use a porous filter made of polymer material such as engineering plastic material, or ceramic material such as silicon oxide, alumina or the like, which is capable of maintaining a stable structure even at a temperature of about 230° C. or higher. Mercury vapor, from which impurities have been removed in the dust control unit 200 including the porous filter 230 made of organic or inorganic material, pass through the condensation recovery unit 300 and are collected as elemental mercury in a collection tank 330. The condensation recovery unit 300 is maintained at the same temperature as that of the thermal desorption unit 100 and the dust control unit 200, but is controlled lower than the condensation temperature of mercury by cooling water which is introduced through a cooling water inlet 310 and discharged through a cooling water outlet 310, and thus mercury vapor is condensed into elemental mercury which is then discharged through the bottom. Next, a gas including the condensed mercury is vented to a post-treatment unit through a vacuum pump 400 disposed at a subsequent stage.

The preferred operating temperature and pressure conditions of each unit in the mercury recovery apparatus of the present invention will now be described with reference to FIG. 6. FIG. 6 shows time-dependent changes in the temperatures and pressures of the thermal desorption unit 100 and the dust control unit 200. Where mercury-containing waste is introduced as a sample 130 into the thermal desorption unit 100, a pretreatment operation is preferably performed at a temperature of about 100° C. and atmospheric pressure (101.3 kPa) for about in order to first remove moisture from the sample 130. During this pretreatment operation, mercury is hardly desorbed from the introduced waste. For this reason, the thermal desorption unit 100 may also be connected directly to the condensation recovery unit 300 through a by-pass line.

After the pretreatment step is performed as described above, the thermal desorption unit 100 is heated to a temperature of 400° C. over about 1 hour. At this time, the pressure of the thermal desorption unit is preferably reduced from atmospheric pressure to the range of 4.0 to 6.67 kPa. FIG. 6 illustrates an example in which the pressure is reduced to a pressure of 6.67 kPa. This vacuum heat-treatment is preferably performed for about 3 hours. In this vacuum heat-treatment, the heat-treatment temperature, time and pressure may be suitably changed depending on the waste content or impurity content of waste or the characteristics of waste, and it is also possible to induce mercury desorption by increasing the temperature while simply maintaining the operating pressure at atmospheric pressure.

When the thermal desorption unit 100 is operated by heating or vacuum-heating so that gaseous mercury may be desorbed from the waste, the dust control unit 200 connected to the thermal desorption unit 100 may be maintained at the same operating pressure as that of the thermal desorption unit 100 and at a lower temperature of about 230° C. so that impurities present together with mercury gas may be condensed on the surface of the porous filter included in the dust control unit 200. After impurities are removed from mercury gas in the dust control unit 200, the mercury gas is condensed and recovered in the condensation recovery unit 300.

Hereinafter, the mercury recovery apparatus and mercury recovery method of the present invention will be described in further detail with reference to specific Comparative Examples and Examples.

Comparative Example: Thermal Desorption and Condensation Recovery of Mercury Waster without Dust Control Unit First, mercury was thermally desorbed from waste under conventional conditions without a dust control unit, and was then condensed. Next, the recovery, thermal desorption and condensation of mercury were analyzed.

Among high-concentration mercury-containing wastes generated in domestic industrial processes, sludge from wastewater treatment was used to perform a recovery test. The specific composition of the wastewater treatment sludge is shown in Table 1 below. In this Comparative Example, a test was performed using 1 kg of the waste treatment sludge, after a condensation unit was connected directly to a thermal desorption unit (see FIG. 1) in order to examine the recovery of mercury in the absence of a dust control unit.

In order to prevent gaseous materials including mercury from being condensed at positions other than the condensation recover unit, the test was performed in a state in which a reactor and connection lines were all heated by heating coils. As shown in FIG. 5, the thermal desorption temperature was maintained at 400° C., and the thermal desorption time was also maintained at 3 hours.

TABLE 1

| Items<br>Sample characteristics | | Values<br>Wastewater treatment sludge |
|---|---|---|
| Mercury content (mg/kg) | Hg | 1,754.99 |
| Industrial analysis | Moisture | 47.09 |
| (wt %) | Volatile | 42.77 |
| | Fixed carbon | 0.51 |
| | Ash | 9.58 |
| Elemental analysis (wt %) | C | 0.40 |
| | H | not detected (N.D.) |
| | N | 0.09 |
| | S | 57.38 |
| Heavy metal contents | As | 242,457.21 |
| (wt %) | Pb | 3,420.50 |
| | Cd | 11,078.36 |
| | Cr | 1.81 |

The mercury recovery test was performed without the dust control unit as described above, and as a result, the recovery of mercury in the condensation recovery unit could not be observed. This is because gaseous materials generated in the thermal desorption unit were condensed and adsorbed on the inner wall of a condensation tube in the condensation recovery unit during the test, and for this reason, the condensation tube was clogged with dust.

Dust collected from the clogged condensation tube was analyzed. As a result, as can be seen from XRD measurement results in FIG. 7, the main component of the dust was $As_2O_3$. In addition, the results of elemental analysis indicated that the dust also contained sulfur or mercury sulfide.

From these test results, it can be seen that the control of impurities, including sulfur, mercury sulfide, $As_2O_3$ dust and the like, is very important in order to effectively recover mercury desorbed from the waste. Pressure-dependent changes in the condensation points of these impurities and mercury are shown in Table 2 below.

TABLE 2

| | Condensation point (° C.) | |
|---|---|---|
| Components | Atmospheric pressure<br>(101.3 kPa) | Vacuum pressure<br>(5.57 kPa) |
| Hg | 357 | 220 |
| S | 444 | 290 |
| HgS | 580 | 492 |
| $As_2O_3$ | 465 | 256 |

As can be seen from the results in Table 2 above, there was a difference in condensation point between mercury and other impurities. Thus, it can be seen that when the dust control unit is operated at a temperature between the condensation point of mercury and the condensation points of impurities, the impurities can be effectively condensed and removed, and when the dust control unit is operated under vacuum pressure, the impurities can be effectively separated from mercury at lower temperatures.

However, for high-temperature operation of this dust control unit, the material of the porous filter included in the dust control unit is important. It is preferable to use a porous filter made of either an engineering plastic material, which has excellent durability at high temperatures compared to conventional polymer materials, or a high-temperature resistant polymer or an inorganic ceramic material such as silica or alumina.

Example 1

In order to examine the movement phenomenon and pathway of elemental mercury in the mercury recovery apparatus including the dust control unit according to the present invention and to determine the recovery of mercury in the apparatus, elemental mercury was introduced, and then the recovery thereof was measured.

70.58 g of elemental mercury was introduced into the thermal desorption unit, and the apparatus was operated as shown in the temperature and pressure graphs of FIG. 6 while the elemental mercury was stirred at 40 rpm. In a pretreatment process, heating to a temperature of 100° C. was first performed, and then heating to 400° C. was performed. This pretreatment process was performed in order to first remove moisture from waste and to confirm whether mercury would change to a gaseous state at these pretreatment heating temperatures and the condensation of mercury would occur.

To measure the amount of mercury vented as gas without being condensed in the condensation recovery unit, the vented gas was collected, and then analyzed using a Method for Analysis of Total Mercury in Vent Gas among Analytical Methods for the Monitoring of Air Pollution Levels. After all the processes in the mercury recovery apparatus were completed, mercury collected in the collection tank and a mercury compound that remained in the units before the processes were recovered, and the recovery of mercury was determined by analyzing the concentration of mercury. The detailed test conditions and results are shown in Tables 3 and 4 below, respectively.

TABLE 3

| Units | Items | Values |
|---|---|---|
| Thermal desorption | Elemental mercury introduced (g) | 70.58 |
| | First heating temperature (° C.) | 100 |
| | First heating time (min) | 120 |
| | Second heating temperature (° C.) | 400 |
| | Second heating time (° C.) | 180 |
| | Temperature (° C.) of line subsequent to vacuum thermal desorption unit | 400 |
| | Thermal desorption pressure (abs; kPa) | 6.67 |
| Dust control | Dust control unit temperature (° C.) | 230 |
| | Temperature (° C.) of line subsequent to dust control line | 400 |

TABLE 4

| Units | | Material names | Mercury amount (mg-Hg) | Recovery (%) |
|---|---|---|---|---|
| Introduced | Thermal desorption | Elemental mercury | 70,583 | — |
| Recovered | Thermal desorption | Mercury compound | 479.44 | 0.68 |
| | Dust control | Mercury compound | 715.09 | 1.01 |
| | Condensation recovery | Elemental mercury | 53,200 | 75.37 |
| | Subsequent stage | Mercury in vent gas | 21.75 | 0.02 |
| | Sum | | | 77.08 |

Mercury was recovered from a total of three places, including the thermal desorption unit, the dust control unit and the condensation recovery unit, at recovery rates of 0.68%, 1.01% and 75.37%, respectively. It could be seen that the mercury recovered was mostly elemental mercury recovered from the collection tank in the condensation recovery unit and that mercury was vented as gas at a very low level of about 0.02%.

The results of this elemental mercury recovery test indicated that mercury was recovered at a rate of 77.8% based on the total amount of mercury introduced and 97.91% of the mercury recovered was elemental mercury recovered from the collection tank connected to the bottom of the condensation recovery unit.

Example 2

Using the mercury recovery apparatus according to the embodiment of the present invention, in which the thermal desorption unit and the dust control unit were connected in series, a test for recovering mercury from actual mercury-containing waste was performed.

Among high-concentration mercury-containing wastes generated in domestic industrial processes, wastewater treatment sludge (the same sample as that in the Comparative Example) was used to perform the recovery test.

989 g of mercury-containing waste was introduced into the thermal desorption unit, and the mercury recovery apparatus was operated under the same temperature and pressure conditions as those shown in FIG. 6 while the waste was stirred. Pretreatment of the waste was performed at atmospheric pressure and 100° C. for 2 hours, and the detailed operation conditions were the same as those described in Example 2 above. After the thermal desorption, dust control and condensation recovery processes were all completed, the mercury concentration in the residue recovered from each process unit was analyzed and the final recovery of mercury was calculated.

The detailed test conditions and procedures will now be described briefly. 0.1 to 2.0 kg of mercury-containing waste from which mercury was to be recovered was introduced into the thermal desorption unit through the inlet, after which the inlet was closed. Next, stirring was performed at a speed of 40 to 120 rpm.

When waste having a high moisture content is introduced, the moisture in the waste can be removed by drying at a set temperature (about 100° C.) for a set time.

Through a control box (not shown), the temperature of connection lines connecting the units to one another (400 to 600° C.), the temperature of the dust control unit (200 to 400° C.), and the temperature of the thermal desorption unit (400 to 600° C.) were set. After setting of the temperatures was completed, operation of the system was started, and the pressure in the reactor was controlled through a vacuum pump and a pressure control valve (about 6.67 kPa, at least 4.00 kPa).

In order to condense materials other than mercury and adsorb and remove the materials by a porous filter disposed in the dust control unit, the temperature of the dust control unit was maintained at 230° C. A cooling water valve in the condensation recovery unit was checked, and cooling water was circulated through the condensation recovery unit.

After mercury was desorbed from the thermal desorption unit and mercury gas was transferred to the dust control unit by a carrier gas, the separation between mercury and gaseous impurities by condensation in the dust control unit was performed using a difference in condensation point therebetween. At this time, gaseous materials other than mercury were condensed and adsorbed in dust form on the surface of the ceramic filter. When a differential pressure in the dust control unit was generated by the adsorbed dust, the air pulse-jet valve 220 was opened and the dust condensed on the surface of the ceramic filter was removed.

In this Example, the porous filter used in the dust control unit was an inorganic ceramic filter (CALDO Inc.) including 65% $SiO_2$ and 35% $Al_2O_3$.

The mercury gas recovered from the dust control unit was transferred to the subsequent condensation recovery unit and recovered therefrom. After all the mercury recovery reactions were completed, the system was cooled to room temperature. During the cooling, stirring was not stopped in order to preventing bending of the blade of the stirrer disposed in the thermal desorption unit. Next, reaction residue in each of the units was recovered, and the results of the recovery are shown in Table 5 below.

TABLE 5

| Units | | Material names | Mercury amount (mg-Hg) | Recovery (%) |
|---|---|---|---|---|
| Introduced | Thermal desorption | Wastewater treatment sludge | 1,735.58 | — |
| Recovered | Thermal desorption | Bottom ash | 59.78 | 3.44 |
| | Dust control | Dust | 119.28 | 6.87 |
| | Condensation recovery | Wastewater | 1.15 | 0.07 |
| | | Elemental mercury | 1,197.5 | 69.0 |
| | Sum | | | 79.38 |

Example 3

A mercury recovery test was performed using the same sample and method as those used in Example 2 above. The results of the test are shown in Table 6 below.

TABLE 6

| Units | Material names | Mercury amount (mg-Hg) | Recovery (%) |
|---|---|---|---|
| Introduced | Thermal desorption | Wastewater treatment sludge | 1,749.84 | — |
| Recovered | Thermal desorption | Bottom ash | 53.15 | 3.06 |
| | Dust control | Dust | 93.76 | 5.40 |
| | Condensation recovery | Wastewater | 0.85 | 0.05 |
| | | Elemental mercury | 1,085.4 | 62.54 |
| | Sum | | | 71.07 |

As can be seen from the results of Examples 2 and 3, the residues recovered using the mercury recovery apparatus of the present invention included the bottom ash from the thermal desorption unit, the dust from the dust control unit, and the wastewater and elemental mercury from the condensation recovery unit. The results of measuring the recovery, the mercury content, the mercury amount and the recovery rate in each Example are shown in Tables 5 and 6 above.

It was shown that the distribution of mercury in the recovered residues was 3.06 to 3.44% in the bottom ash, 5.40 to 6.87% in the dust, and 0.05 to 0.07% in the wastewater, and that 62.54 to 69.00% of mercury was recovered as elemental mercury. In addition, it was shown that the total recovery of mercury was 71.06 to 79.38% based on the amount of mercury introduced.

This suggests that the mercury recovery apparatus of the present invention, which includes the dust control unit connected in series to the thermal desorption unit, can effectively remove gaseous impurities other than mercury by condensation and adsorption based on the difference in operating temperature between the units, and that elemental mercury in the condensation recovery unit can be recovered with higher purity.

Example 4

In order to examine the recovery of mercury using the mercury recovery apparatus of the present invention for wastes having the characteristics and shapes different from those of the mercury-containing wastewater treatment sludge used in Examples 2 and 3 above, a recovery test was performed using two kinds of fly ashes among mercury-containing wastes generated in domestic industrial processes.

In order to simulate high-concentration mercury-containing waste for the fly ashes, high-concentration mercury was spiked, thereby preparing sample 1 and sample 2 from the mercury-containing fly ashes having any mercury concentration. The detailed compositions of the samples are shown in Table 7 below.

About 1.0 kg of waste including spiked mercury was introduced into the thermal desorption unit, and the apparatus was operated as shown in the temperature and pressure graphs of FIG. 5. After completion of the processes, a small amount of wastewater collected in the collection tank, mercury, and residues remaining in the units before the processes were recovered, and the concentration of mercury was analyzed and the final recovery of mercury was calculated. The detailed characteristics of the waste are shown in Table 7 below.

TABLE 7

| Items Sample characteristics | | Values Sample 1 | Sample 2 |
|---|---|---|---|
| Mercury content (mg/kg) | Hg | 103.34 | 92.22 |
| Mercury spiked (mg) | Hg | 4,881 | 5,127 |
| Industrial analysis (wt %) | Moisture | 3.95 | 6.80 |
| | Volatile | 18.52 | 15.09 |
| | Fixed carbon | 0.88 | 8.36 |
| | Ash | 76.66 | 69.75 |
| Elemental analysis (wt %) | C | 3.51 | 3.93 |
| | H | 0.24 | 1.51 |
| | N | 0.08 | 0.03 |
| | S | 5.73 | 0.45 |
| Heavy metal content (mg/kg) | As | N.D | 0.95 |
| | Pb | 42.22 | 147.87 |
| | Cd | 3.71 | 4.56 |
| | Cr | 9.13 | 10.17 |

Detailed test conditions for fly ash samples 1 and 2 were the same as those used in Examples 2 and 3, and the test results for fly ash samples 1 and 2 are summarized in Tables 8 and 9 below.

TABLE 8

| Units | Material names | Mercury amount (mg-Hg) | Recovery (%) |
|---|---|---|---|
| Introduced | Thermal desorption | Sample 1 (fly ash) | 4,987.65 | — |
| Recovered | Thermal desorption | Bottom ash | 54.35 | 1.09 |
| | Dust control | Dust | 225.94 | 4.53 |
| | Condensation recovery | Wastewater | 3.62 | 0.07 |
| | | Elemental mercury | 2,990 | 60.06 |
| | Sum | | | 65.75 |

TABLE 9

| Units | Material names | Mercury amount (mg-Hg) | Recovery (%) |
|---|---|---|---|
| Introduced | Thermal desorption | Sample 2 (fly ash) | 5,220.79 | — |
| Recovered | Thermal desorption | Bottom ash | 91.42 | 1.83 |
| | Dust control | Dust | — | — |
| | Condensation recovery | Wastewater | 2.67 | 0.05 |
| | | Elemental mercury | 3,210 | 64.3 |
| | Sum | | | 66.18 |

As can be seen from the recovery test results for mercury-containing fly ashes in Tables 8 and 9 above, the recovered residues included the bottom ash from the thermal unit, the dust from the dust control unit, and the wastewater and elemental mercury from the condensation recovery unit, like those in Examples 2 and 3 above. The mercury amount and recovery in each residue are summarized in the Tables.

It was shown that the distribution of mercury in the recovered residues was 1.09 to 1.83% in the bottom ash, 0 to 4.53% in the dust, and 0.05 to 0.07% in the wastewater, and that 60.06 to 64.30% of mercury was recovered as elemental mercury. In addition, the elemental mercury was mostly recovered together with wastewater from the condensation recovery unit, and the total recovery of mercury was about 65.75 to 66.18% based on the amount of mercury introduced.

Like Examples 2 and 3 above, it could be experimentally found that the mercury recovery apparatus of the present invention could recover mercury not only from wastewater treatment sludge, but also from mercury-containing waste generated as fly ash.

Example 5

After the operating pressure of the apparatus of the present invention was controlled to atmospheric pressure, a comparative test for mercury recovery was performed at a temperature of 500° C. and atmospheric pressure. The test was performed twice at dust control unit temperatures of 420° C. and 440° C., respectively.

TABLE 10

| Units | Items | Test at atmospheric pressure |
|---|---|---|
| Thermal desorption | Elemental mercury introduced (g) | 4.885/5.065 |
| | First heating temperature (° C.) | 100 |
| | First heating time (min) | 120 |
| | Second heating temperature (° C.) | 500 |
| | Second heating time (min) | 180 |
| | Temperature of line subsequent to vacuum thermal desorption unit (° C.) | 500 |
| | Thermal desorption pressure (abs, kPa) | 101.3 |
| Dust control | Temperature of dust control unit (° C.) | 420/440 |
| | Temperature of line subsequent to dust control unit (° C.) | 500 |

The apparatus was operated at atmospheric pressure as described above, and the recovery of mercury at each of dust control unit temperatures of 420° C. and 440° C. was analyzed. As a result, it was shown that the recovery of mercury was reduced (48.68% at 420° C. and 52.09% at 440° C.) compared to that obtained under vacuum pressure.

TABLE 11

| | Units | Material names | Mercury amount (mg-Hg) | Recovery (%) |
|---|---|---|---|---|
| Introduced | Thermal desorption | Fly ash | 4.885 | — |
| Recovery at 420° C. | Thermal desorption | Bottom ash | 0.171 | 3.51 |
| | Dust control | Dust | 2.204 | 45.12 |
| | Condensation recovery | Wastewater | 0.002 | 0.05 |
| | | Elemental mercury | — | — |
| | Sum | | | |
| Introduced | Thermal desorption | Fly ash | 5.065 | — |
| Recovery at 440° C. | Thermal desorption | Bottom ash | 0.133 | 2.63 |
| | Dust control | Dust | 2.502 | 49.39 |
| | Condensation recovery | Wastewater | 0.004 | 0.07 |
| | | Elemental mercury | — | — |
| | Sum | | | |

As can be seen from the test results in Table 11 above, the effect of recovering mercury was reduced at atmospheric pressure (even though the heating temperature was as high as about 100° C.) compared to vacuum pressure. In addition, it could be experimentally found that the setting of pressure was very important in the present invention.

Example 6

In order to examine the effect of the temperature of the dust control unit in addition to the effect of pressure as described above, a test for mercury recovery was performing at varying temperatures ranging from 220° C. to 260° C. Specifically, an additional test was performed under the same conditions as those of Example 3 above while only the temperature of the dust control unit was changed as follows. At this time, the amount of mercury introduced was changed depending on the temperature of the dust control unit (see Table 12 below).

TABLE 12

| Units | Items | |
|---|---|---|
| Thermal desorption | Elemental mercury introduced (g) | 4.950/1,735.58/5.020/4.965/4.853 |
| | First heating temperature (° C.) | 100 |
| | First heating time (min) | 120 |
| | Second heating temperature (° C.) | 400 |
| | Second heating time (min) | 180 |
| | Temperature of line subsequent to vacuum thermal desorption unit (° C.) | 400 |
| | Thermal desorption pressure (abs, kPa) | 6.67 |
| Dust control | Temperature of dust control unit (° C.) | 220/230/240/250/260 |
| | Temperature of line subsequent to dust control unit (° C.) | 400 |

The recovery of mercury in each case is summarized in Table 13 below.

TABLE 13

| Temperature of dust control unit (° C.) | Total mercury recovery (%) | Recovery of elemental mercury (%) |
|---|---|---|
| 220 | 74.08 | 65.64 |
| 230 | 79.38 | 59.00 |
| 240 | 72.16 | 66.15 |
| 250 | 54.20 | 44.37 |
| 260 | 58.84 | 9.56 |

As can be seen from the test results in Table 13 above, the total mercury recovery and the recovery of elemental mercury all decreased as the temperature of the dust control unit increased.

The temperature range used in the mercury recovery apparatus of the present invention will now be described in more detail. First, because mercury should not be condensed, the temperature should be higher than the condensation point of mercury at vacuum pressure (6.67 kPa). If the temperature excessively increases, the total mercury recover will decrease, and particularly, the recovery of elemental mercury will decrease rapidly.

Namely, at a temperature up to 260° C., it could be experimentally found that the proportion of pure elemental mercury recovered decreased rapidly (although an exact mechanism has not yet been understood). This phenomenon appears to be closely associated with whether $As_2O_3$ among impurities present along with mercury is condensed. Namely, it is considered that if $As_2O_3$ among impurities contained mainly in mercury waste is not condensed and removed, the recovery of elemental mercury decreases rapidly due to the interaction of elemental mercury with $As_2O_3$, even if other impurities such as sulfur or hydrogen sulfide are condensed and removed.

The above description of the present invention is exemplary, and those of ordinary skill in the art will appreciate that the present invention can be easily modified into other specific forms without departing from the technical spirit or essential characteristics of the present invention. Therefore, it should be understood that the exemplary embodiments described above are exemplary in all aspects and are not restrictive. For example, each component described to be of a single type can be implemented in a distributed manner. Likewise, components described to be distributed can be implemented in a combined manner.

The scope of the present invention is defined by the following claims rather than by the detailed description of the invention. It shall be understood that all modifications and embodiments conceived from the meaning and scope of the claims and their equivalents are included in the scope of the inventive concept.

INDUSTRIAL APPLICABILITY

The present invention relates to an apparatus for treating mercury-containing waste and a method of recovering high-purity elemental mercury using the apparatus, and more particularly to a method capable of recovering high-purity elemental mercury from mercury-containing waste in a more cost-effective and secure manner by use of an apparatus for recovering mercury from mercury-containing waste, in which the apparatus includes a thermal desorption unit, a dust control unit and a condensation recovery unit, which are connected in series. The present invention is industrially applicable.

The invention claimed is:

1. An apparatus for recovering mercury from mercury-containing waste, the apparatus comprising:
   a vacuum thermal desorption unit configured to separate mercury from the mercury-containing waste;
   a dust control unit configured to remove impurities from the separated mercury; and
   a condensation recovery unit configured to condense and recover the mercury from which the impurities have been removed,
   wherein the dust control unit is operated between 220° C. and 256° C., and
   the vacuum thermal desorption unit, the dust control unit, and the condensation recovery unit are operated at 6.67 kPa.

2. The apparatus of claim 1, wherein the vacuum thermal desorption unit is operated at a temperature at which mercury is vaporized from the mercury-containing waste.

3. The apparatus of claim 1, wherein the dust control unit includes a porous filter, and is operated at a temperature lower than the operating temperature of the vacuum thermal desorption unit so that impurities present together with mercury vapor will be condensed on a surface of the porous filter.

4. The apparatus of claim 1, wherein the vacuum thermal desorption unit is configured to directly receive a mercury waste drum.

* * * * *